T. J. MURPHY.
Reciprocating Churns.
No. 198,665. Patented Dec. 25, 1877.
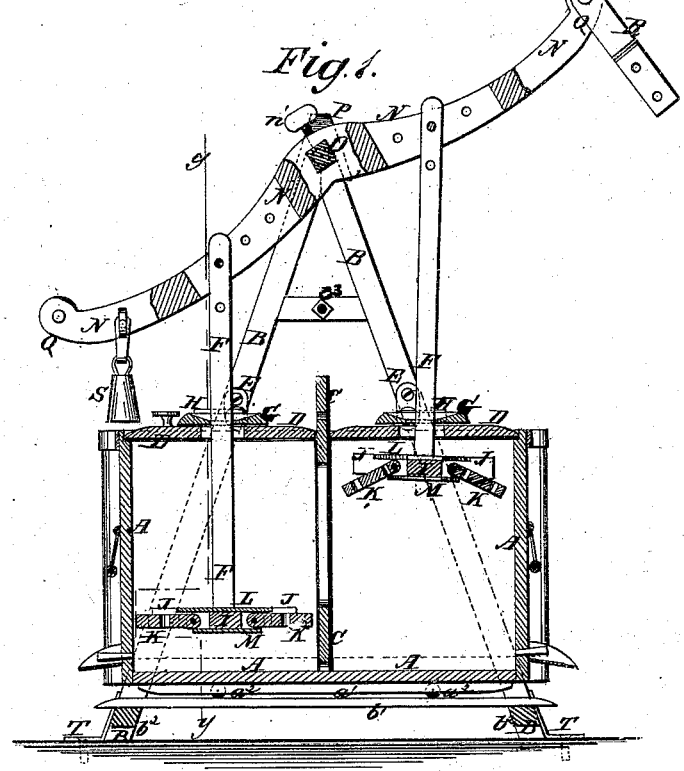
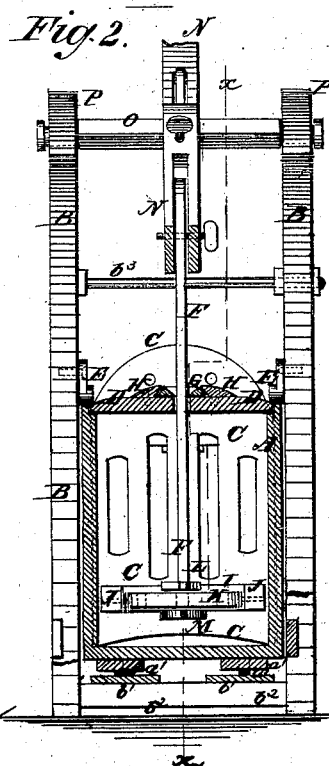

UNITED STATES PATENT OFFICE.

THOMAS J. MURPHY, OF BUSTI, IOWA, ASSIGNOR TO HIMSELF AND PATRICK M. DALY, OF SAME PLACE.

IMPROVEMENT IN RECIPROCATING CHURNS.

Specification forming part of Letters Patent No. 198,665, dated December 25, 1877; application filed May 12, 1877.

*To all whom it may concern:*

Be it known that I, THOMAS JOHN MURPHY, of Busti, in the county of Howard and State of Iowa, have invented a new and useful Improvement in Churning Apparatus, of which the following is a specification:

Figure 1 is a vertical longitudinal section of my improved churn, taken through the line $x\,x$, Fig. 2. Fig. 2 is a vertical cross-section of the same, taken through the line $y\,y$, Fig. 1.

Similar letters of reference indicate corresponding parts.

The object of this invention is to furnish an improved churning apparatus which shall be so constructed as to enable the milk to be churned very quickly and thoroughly, and with a comparatively small amount of labor.

The invention will first be described in connection with the drawing, and then pointed out in the claims.

A represents the box, which is made rectangular in form, and to its bottom is attached two longitudinal strips, $a^1$. The strips $a^1$ are beveled at their ends, and are slotted to receive the rollers $a^2$, which are pivoted in said slots in such positions that their faces may project to rest upon the floor and upon the platform $b^1$, so that the churn-body A may be easily moved from place to place, and to and from the said platform $b^1$. The platform $b^1$ has its ends beveled, and is secured to the cross-bars $b^2$, that connect the lower parts of the A-shaped side frames B. The upper parts of the side frames B are connected by a rod or long bolt, $b^3$, to keep said side frames B parallel with each other.

The churn-body A is divided into two equal compartments by a vertical partition, C, which is slid into grooves in the sides of said churn-body, and which has slots or perforations formed through it, to allow the milk to pass freely from one of said compartments to the other.

The top of the churn-body is covered with covers D, which are secured in place by buttons E, pivoted to the side frames B in such positions that when turned down they may fasten the said covers D in place upon the churn-body A, and at the same time fasten the said body in place upon the platform $b^1$, to hold it stationary while the apparatus is being used.

The covers D are slotted for the passage of the dasher-shafts F, which also pass through holes in the plates G, placed upon the covers D, and which slide in grooves in cleats H attached to said covers. The plates G are designed to keep the milk from spattering out through the slots in the covers D, and their upper sides are concaved to allow any milk that may be carried up by the dasher-shafts to flow back into the churn-body. To the lower end of each of the dasher-shafts F is attached a cross-bar, I, to the ends of which, and at right angles therewith, are attached the middle parts of two bars, J.

To the bars J, upon the opposite sides of and close to the cross-bar I, are pivoted the inner corners of two plates, K, which are perforated to allow the milk to pass through them freely.

The plates K are kept from rising above a horizontal position, when the dashers are forced downward, by a stop-bar, L, attached to the middle part of the upper side of the cross-bar I.

To the middle part of the lower side of the cross-bar I is attached a stop-bar, M, to prevent the plates K, when the dasher is raised, from dropping so low that they will not swing outward when the dasher is again pressed downward.

The upper ends of the dasher-shafts F enter longitudinal slots in the arms of the lever N, where they are pivoted by pins. Several holes are formed in the lever N and in the dasher-shafts F, to receive the pivoting-pins, so that the dashers may be adjusted as circumstances may require.

The lever N has a square hole formed through its center to receive the rock-shaft O, where it is secured in place by a set-screw, $n'$, so that it may be adjusted to center the dasher-shafts F, to prevent them from rubbing against the covers D at the sides of the slots through said covers.

The journals of the rock-shaft O work in bearings attached to the apices of the side frames B, and which are covered by cast-iron boxes P, said boxes serving also as clasps to strengthen the top of the said frames.

To the ends of the lever N are attached cross-rods Q, to serve as handles for operating the said lever.

When the apparatus is to be operated by a wind-wheel or other mechanical power, a coupling, R, is attached to one end of the lever N, and a weight, S, is suspended from the other end, as shown in Fig. 1.

When the apparatus is worked by hand-power the attachments R S are not required.

Angle-irons T may be attached to the lower ends of the frames B to enable the apparatus to be secured to the floor, to hold it stationary while being used.

Having thus described my invention, I claim as new and desire to secure by Letters Patent—

1. The combination, with rolling box A D, divided by a slotted partition, C, of the dashers I J K L M, arranged as and for the purpose specified.

2. The combination, with churn-body, frame B, and pistons attached to rods F, of the lever N, coupling R, and weight S, as and for the purpose specified.

3. The combination of the side frames B, provided with the platform $b^1$ and the cross-bars $b^2$ $b^3$, the rock-shaft O, and the slotted lever N with each other, and with the churn-body A and the dasher-shafts F, substantially as herein shown and described.

THOMAS JOHN MURPHY.

Witnesses:
  JOHN DOYL,
  PATRICK ROACH.